US012235066B2

(12) United States Patent
Kim et al.

(10) Patent No.: US 12,235,066 B2
(45) Date of Patent: Feb. 25, 2025

(54) AUTONOMOUS TRANSPORT-BASED UNMANNED AMMUNITION LOADING SYSTEM FOR STATIONARY GUNS AND AUTOMATIC LOADING DEVICE CONSTITUTING SAME

(71) Applicant: AGENCY FOR DEFENSE DEVELOPMENT, Daejeon (KR)

(72) Inventors: Bo-Seong Kim, Daejeon (KR); Seung-Jae Lee, Daejeon (KR); Kwan-Jin Park, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/029,874

(22) PCT Filed: Apr. 12, 2022

(86) PCT No.: PCT/KR2022/005306
§ 371 (c)(1),
(2) Date: Mar. 31, 2023

(87) PCT Pub. No.: WO2022/250290
PCT Pub. Date: Dec. 1, 2022

(65) Prior Publication Data

US 2023/0366646 A1 Nov. 16, 2023

(30) Foreign Application Priority Data

May 27, 2021 (KR) ........................ 10-2021-0068443

(51) Int. Cl.
*F41A 9/38* (2006.01)
*B66F 9/065* (2006.01)
*F41A 9/87* (2006.01)

(52) U.S. Cl.
CPC ................ *F41A 9/38* (2013.01); *B66F 9/065* (2013.01); *F41A 9/87* (2013.01)

(58) Field of Classification Search
CPC ..................................... F41A 9/38; F41A 9/87
See application file for complete search history.

(56) References Cited

U.S. PATENT DOCUMENTS 4,522,548 A * 6/1985 Oswald ..................... B60P 3/00 414/458
5,083,892 A * 1/1992 Oswald ..................... B60P 3/00 414/458
(Continued)

FOREIGN PATENT DOCUMENTS

EP 0492932 A2 7/1992
JP 2021513048 A 5/2021
(Continued)

OTHER PUBLICATIONS

Doc with machine translation (Year: 2021).*
International search report of PCT/KR2022/005306, Jul. 8, 2022, English translation.

*Primary Examiner* — Bret Hayes
(74) *Attorney, Agent, or Firm* — STIP Law Group, LLC

(57) ABSTRACT

The present invention provides a system for autonomously conveying and loading a shell into a fixed gun, the system including an autonomous conveyance device configured to autonomously travel and move according to an autonomous driving program from a shell storage location to a fixed gun fixed to a gun mount that is a destination, an automatic loading device configured to hold a testing shell and automatically load the testing shell into a cartridge chamber of the fixed gun, and a shell lifting device mounted on an upper surface of the autonomous conveyance device and a lower surface of the automatic loading device and configured to move the automatic loading device upward or downward.
(Continued)

According to the present invention, a process of conveying and loading the shell into the testing fixed gun may be autonomously performed in an unmanned manner.

13 Claims, 9 Drawing Sheets

(56) References Cited

U.S. PATENT DOCUMENTS

| | | | | |
|---|---|---|---|---|
| 5,451,134 | A * | 9/1995 | Bryfogle | B64F 5/50 248/653 |
| 2004/0062630 | A1 * | 4/2004 | Marrero | F41A 9/87 414/589 |
| 2013/0168499 | A1 * | 7/2013 | Grossman | B64F 5/60 244/135 A |
| 2020/0200506 | A1 * | 6/2020 | Campbell | F41F 3/08 |
| 2022/0041416 | A1 * | 2/2022 | Viola | B60P 9/00 |

FOREIGN PATENT DOCUMENTS

| | | | | |
|---|---|---|---|---|
| KR | 960014717 | B1 | 12/1997 | |
| KR | 20160136147 | A | 11/2016 | |
| KR | 20190017709 | A | 2/2019 | |
| KR | 102219939 | B1 | 2/2021 | |
| KR | 102297996 | B1 * | 9/2021 | G01B 7/30 |
| KR | 102326233 | B1 | 11/2021 | |

* cited by examiner

AUTONOMOUS TRANSPORT-BASED UNMANNED AMMUNITION LOADING SYSTEM FOR STATIONARY GUNS AND AUTOMATIC LOADING DEVICE CONSTITUTING SAME

CROSS-REFERENCE TO RELATED APPLICATIONS

This application is the U.S. National Phase under 35 U.S.C. § 371 of International Application No. PCT/KR2022/005306, filed on Apr. 12, 2022, which in turn claims the benefit of Korean Application No. 10-2021-0068443, filed on May 27, 2021, the disclosures of which are incorporated by reference into the present application.

TECHNICAL FIELD

The present invention relates to a system for autonomously conveying and loading a shell into a fixed gun in an unmanned manner.

BACKGROUND ART

Large-caliber tank gun shells, such as 105 mm caliber shells or 120 mm caliber shells, need to be subjected to mass-production tests and development tests based on defense standards. Up to now, a process of conveying and loading shells during a process of testing domestic gun shells depends on manpower of test operators, which causes the flowing problems.

First, during a process in which a test operator conveys and loads a non-examined shell to a long distance, the test operator is exposed to a risk of a safety accident caused by various reasons such as a human error, a defect of a gun battery, and an abnormal operation of a shell.

Second, the test operator may have musculoskeletal diseases during the process of repeatedly conveying and loading the heavy-weight shell, and the test operator may experience a high degree of fatigue while performing the test. These human and physical risk factors may adversely affect the test performing method that depends on manpower.

Accordingly, to improve efficiency in testing the gun shell and ensure test safety, there is a need to reduce a high degree of work fatigue of a test operator and eliminate a dangerous environment by more efficiently performing a process of repeatedly loading and conveying shells.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to solve the above-mentioned problems, and an object of the present invention is to provide a technology for autonomously performing a process of conveying and loading a shell into a testing fixed gun in an unmanned manner and to perform a firing preparation process in an unmanned manner by combining a process in the related art of manually and directly conveying and loading a shell, an autonomous driving technology, and an automatic loading technology based on robotics.

Technical Solution

One aspect of the present invention provides a system for autonomously conveying and loading a shell into a fixed gun, the system including: an autonomous conveyance device configured to autonomously travel and move according to an autonomous driving program from a shell storage location to a fixed gun fixed to a gun mount that is a destination; an automatic loading device configured to hold a testing shell and automatically load the testing shell into a cartridge chamber of the fixed gun; and a shell lifting device mounted on an upper surface of the autonomous conveyance device and a lower surface of the automatic loading device and configured to move the automatic loading device upward or downward.

Further, the shell lifting device may include: a lifting members coupled to intersect one another by a hinge shaft; and a hydraulic actuator configured to rotate the lifting members about the hinge shaft.

In addition, the automatic loading device may include: a tray on which the testing shell is seated; and a rammer coupling member mounted on an upper surface of a rear end of the tray, and the automatic loading device may further include a shell rammer device configured to load the testing shell, which is seated on the tray, into the cartridge chamber.

In addition, the shell rammer device may include: a rammer having a rear end coupled to the rammer coupling member, the rammer having a front end disposed rearward of the testing shell;

and a rammer driving means configured to move the rammer forward or rearward.

Further, a loading position sensor may be mounted at an upper end of a front end of the tray and detect a loading position of the testing shell made by a forward movement of the rammer.

Further, a rammer alignment sensor may be mounted at an upper end of the rear end of the tray and detect a retracted position of the rammer.

A blocker detection sensor is mounted at one side of a front end of the rammer and detect a distance between the rammer and a blocker configured to close the cartridge chamber.

Further, a rear end of the rammer may be rotatably coupled to the rammer coupling member, and the rammer may be rotated about the rammer coupling member by an operation of the blocker.

Meanwhile, an impact mitigation spring may be embedded in the shell rammer device and mitigate impact from a front side of the rammer.

The system may further include: a camera mounting member provided at the rear end of the tray; and a camera mounted on the camera mounting member.

In addition, a cartridge chamber proximity sensor may be mounted on the tray and detect whether the tray moves upward and reaches a reference position aligned with a height of the cartridge chamber.

Further, the autonomous conveyance device may include a drive means configured to operate the autonomous conveyance device, and the system may include: a controller for autonomous driving and remote control; a communicator configured to communicate with an external remote control system; a rechargeable battery configured to supply power to the drive means, the controller, and the communicator; and a proximity sensor embedded to detect a surrounding environment during autonomous driving.

Another aspect of the present invention provides an automatic loading device, which holds a testing shell, is moved upward or downward by a shell lifting device, and automatically loads the testing shell into a cartridge chamber of a fixed gun, the automatic loading device including: a tray on which the testing shell is seated; a rammer coupling member mounted on an upper surface of a rear end of the tray; and a rammer having a rear end coupled to the rammer coupling member and configured to load the testing shell, which is seated on the tray, into the cartridge chamber.

Further, the automatic loading device may further include: a ball screw coupled to the rammer; and drive motor configured to rotate the ball screw.

In addition, a loading position sensor may be mounted at an upper end of a front end of the tray and detect a loading position of the testing shell made by a forward movement of the rammer, and a rammer alignment sensor may be mounted at an upper end of a rear end of the tray and detect a retracted position of the rammer.

Further, a blocker detection sensor may be mounted at one side of a front end of the rammer and detect a distance between the rammer and a blocker configured to close the cartridge chamber, a rear end of the rammer may be rotatably coupled to the rammer coupling member, and the rammer may be rotated about the rammer coupling member by an operation of the blocker.

An impact mitigation spring may be embedded in the rammer and mitigate impact from a front side of the rammer.

In addition, the automatic loading device may further include: a camera mounting member provided at the rear end of the tray; and a camera mounted on the camera mounting member.

Advantageous Effects

The system for autonomously conveying and loading a shell into a fixed gun and the automatic loading device according to the present invention provide the flowing effects.

First, the processes of conveying and loading the shell required for the shooting test are performed in an unmanned manner. Therefore, it is expected that a degree of test fatigue and musculoskeletal diseases of the test operator will be significantly reduced. In addition, the operations of the test operator directly handling the shell may be reduced. It is possible to improve the safety related to the test in which there is a risk of a safety accident and a mortality accident in the related art.

Second, the processes of conveying and loading the shell are performed in an unmanned manner, such that the number of operators required to perform the gun shell test may be reduced. It is possible to greatly improve the current test technique that depends on human labor, improve the efficiency in performing annual gun shell tests, and increase flexibility in operating manpower in the departments.

Third, the processes of handling and loading the shell requiring proficiency are automated and performed in an unmanned manner. Therefore, it is expected to reduce the period of test work for unskilled workers and reduce a risk caused by a human error.

MODE FOR INVENTION

In order to sufficiently understand the present invention, advantages in operation of the present invention, and the object to be achieved by carrying out the present invention, reference needs to be made to the accompanying drawings for illustrating an exemplary embodiment of the present invention and contents disclosed in the accompanying drawings.

Further, in the description of the present invention, the repetitive descriptions of publicly-known related technologies will be reduced or omitted when it is determined that the descriptions may unnecessarily obscure the subject matter of the present invention.

Figure 1:
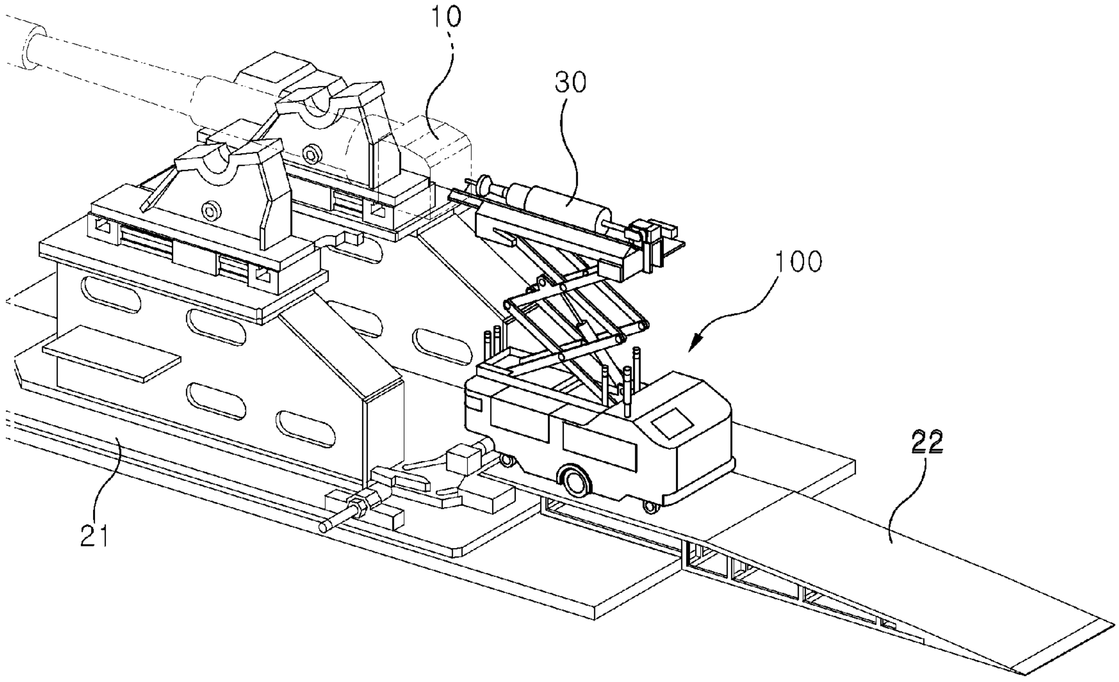
FIG. 1 is a view illustrating a system for autonomously conveying and loading a shell into a fixed gun according to the present invention.
Figure 2:
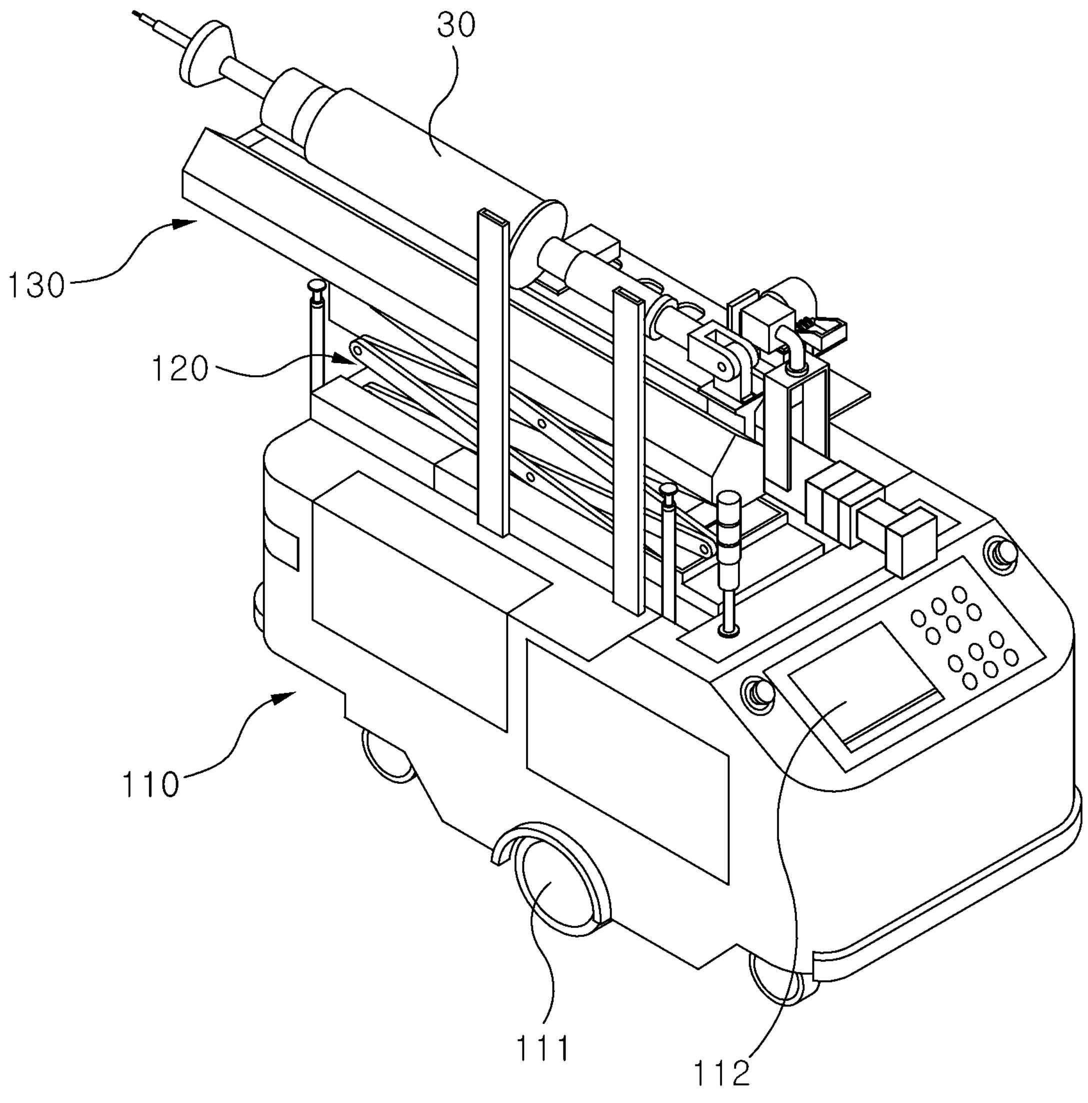
FIGS. 2 and 3 are views illustrating operating states of the system for autonomously conveying and loading a shell into a fixed gun according to the present invention.
Figure 3:
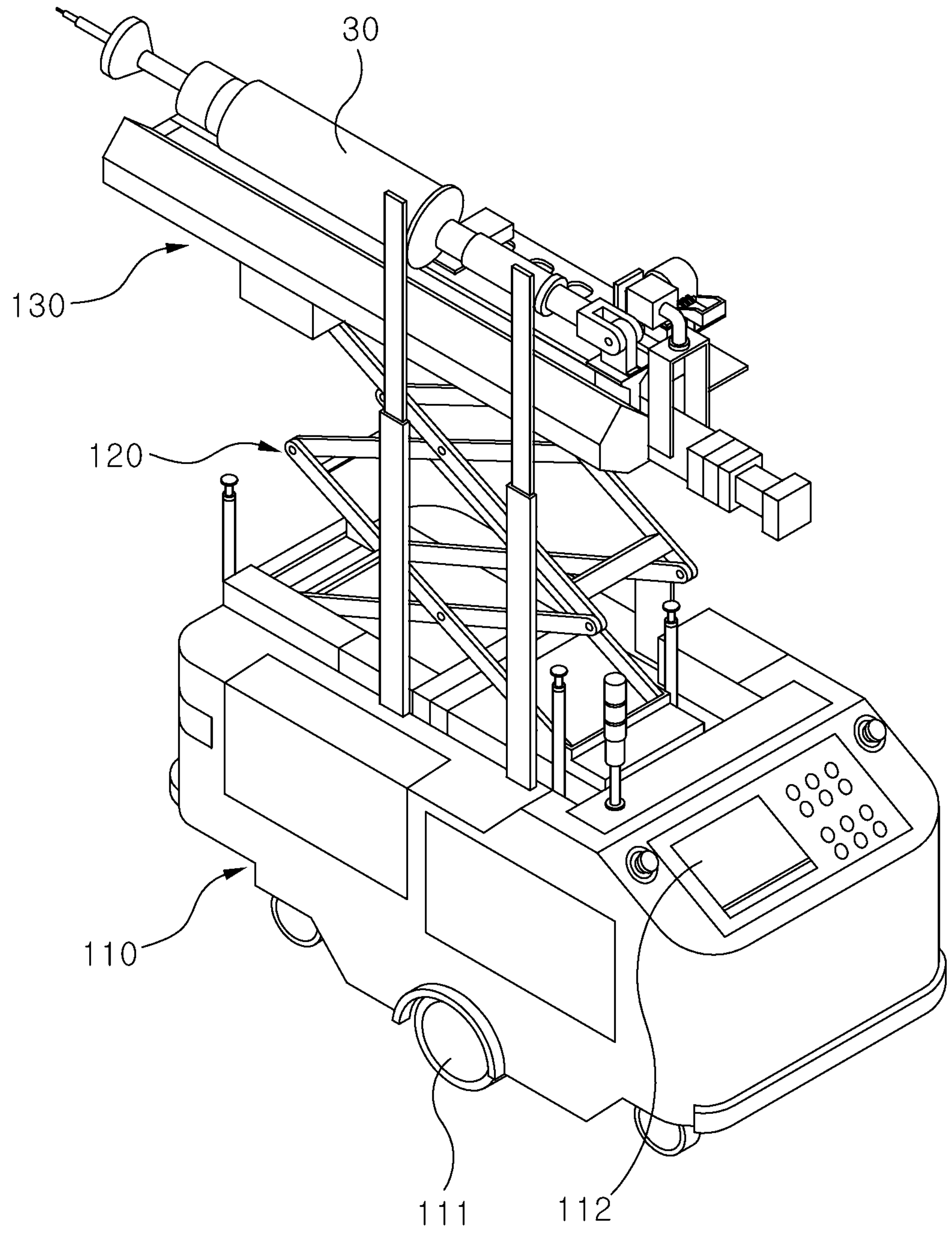

FIG. 1 is a view illustrating a system for autonomously conveying and loading a shell into a fixed gun according to the present invention, and FIGS. 2 and 3 are views illustrating operating states of the system for autonomously conveying and loading a shell into a fixed gun according to the present invention. Further, FIG. 4 is a view illustrating an unmanned conveyance process of the system for autonomously conveying and loading a shell into a fixed gun according to the present invention.

Hereinafter, a system for autonomously conveying and loading a shell into a fixed gun and an automatic loading device constituting the same according to an embodiment of the present invention will be described with reference to FIGS. 1 to 4.

An unmanned shell loading system 100 according to the present invention refers to a system capable of automatically loading a testing shell 30 into a fixed gun for a shooting test in an unmanned manner and conveying the testing shell 30 from a shell storage position in an unmanned manner while autonomously traveling.

Figure 4:
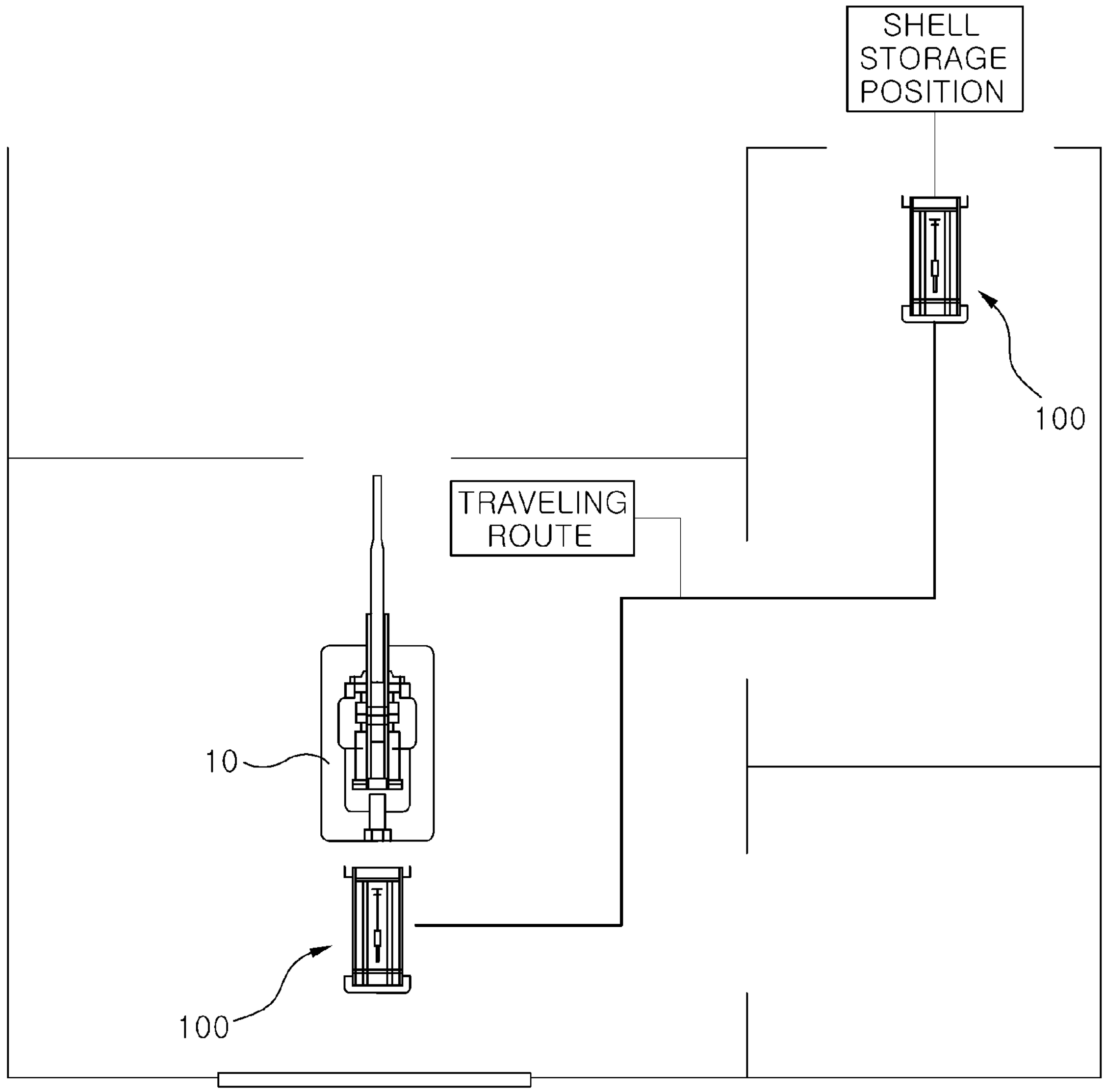
FIG. 4 is a view illustrating an unmanned conveyance process of the system for autonomously conveying and loading a shell into a fixed gun according to the present invention.

To this end, as illustrated in FIGS. 1 and 4, the unmanned shell loading system 100 includes an autonomous conveyance device 110, a shell lifting device 120, an automatic loading device 130, and a shell rammer device 140. In a state in which the shell lifting device 120, the automatic loading device 1300, and the shell rammer device 140 are mounted on the autonomous conveyance device 100, the unmanned shell loading system 100 autonomously travels from the shell storage position to a fixed gun 10 along a designed route in order to prepare the test, and the automatic loading device 130 loads the testing shell 30 into a gun battery cartridge chamber 11 of the fixed gun 10.

The fixed gun 10 is fixedly mounted on a gun mount 21. Therefore, the fixed gun 10 has a level difference from the ground surface, such that the unmanned shell loading system

100 may move along an inclined structure 22 connected to a rear side of the fixed gun 10 that is a loading position.

The unmanned shell loading system 100 has both an autonomous conveyance function and an automatic loading function. To implement the autonomous conveyance, the autonomous conveyance device 110 moves along a predetermined route according to an autonomous movement algorithm (autonomous driving program). A proximity sensor may be mounted on the autonomous conveyance device 110 to prevent a collision while the autonomous conveyance device 110 travels, such that the unmanned shell loading system 100 may safely convey the testing shell 30 to a destination.

The autonomous driving may use image recognition or a wired guide or lidar based on a route scheme using a magnetic tape/spot.

In addition, an electromagnetic sensor or an optical recognition sensor may be provided to identify a traveling route.

A drive means 111 for movement is provided, and an operation panel 112 is provided on a rear part or the like, such that a user may recognize states and perform manipulation. The drive means 111 may include two main wheels configured to be driven by an electric motor, and four auxiliary wheels configured to be passively moved. Further, the user may identify, through the operation panel 112, task assignment and work status such as operations of stopping, returning, and driving the unmanned device.

A controller may be embedded to perform the autonomous driving or the like, and a communicator may be provided to communicate with a remote control. A rechargeable battery may be embedded to perform the unmanned operation.

The shell lifting device 120 is mounted on an upper surface of the autonomous conveyance device 110, and the automatic loading device 130 is mounted on the shell lifting device 120. The automatic loading device 130 holds and conveys the testing shell 30.

Further, as illustrated in FIG. 2, the unmanned shell loading system 100 operates in a conveyance mode in a state in which the shell lifting device 120 is moved downward. As illustrated in FIG. 3, in a loading mode, the shell lifting device 120 is moved upward, and the unmanned shell loading system 100 operates to load the testing shell 30.

Figure 5:
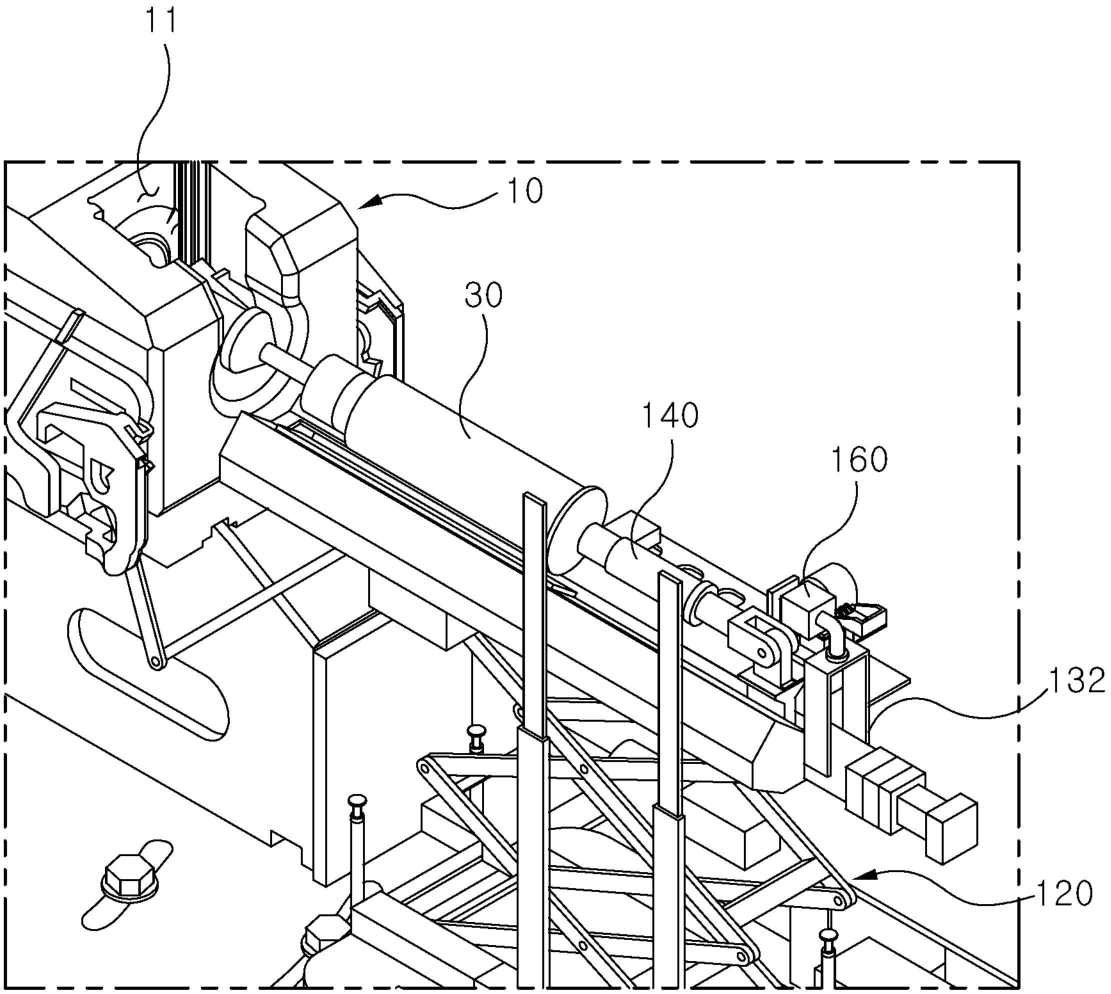
FIGS. 5 and 6 are views illustrating a shell loading operation of the system for autonomously conveying and loading a shell into a fixed gun according to the present invention.
Figure 6:
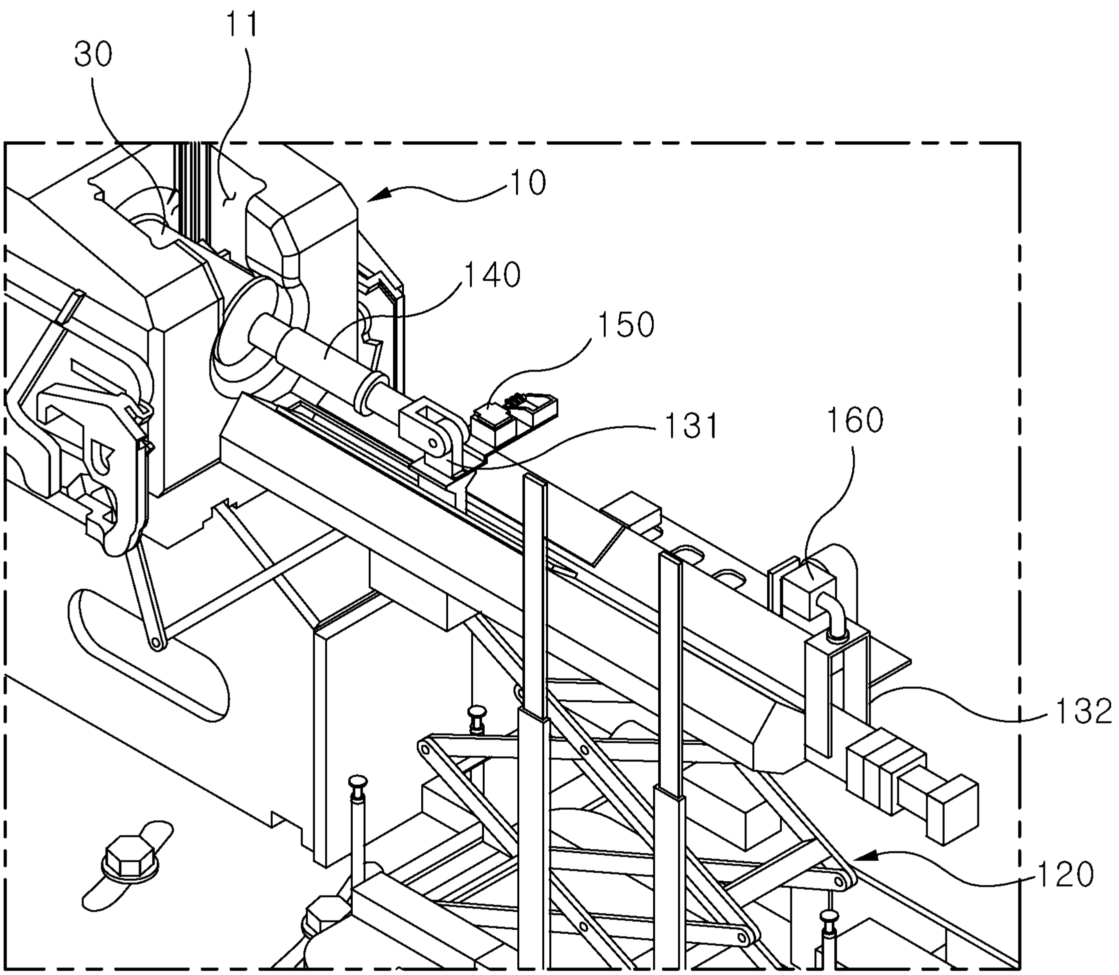
Figure 7:
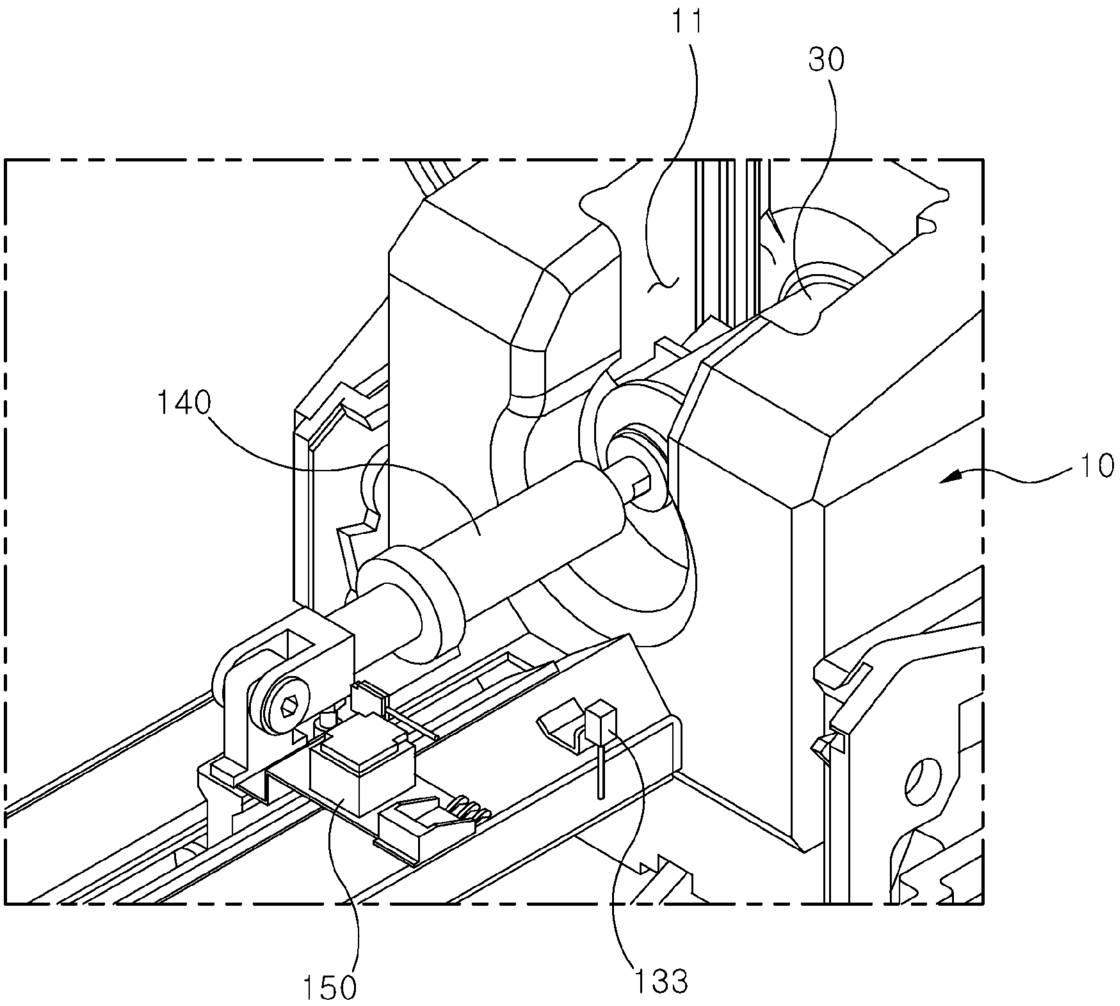
FIGS. 7 and 8 are views illustrating states in which a shell is loaded by the system for autonomously conveying and loading a shell into a fixed gun according to the present invention.
Figure 8:
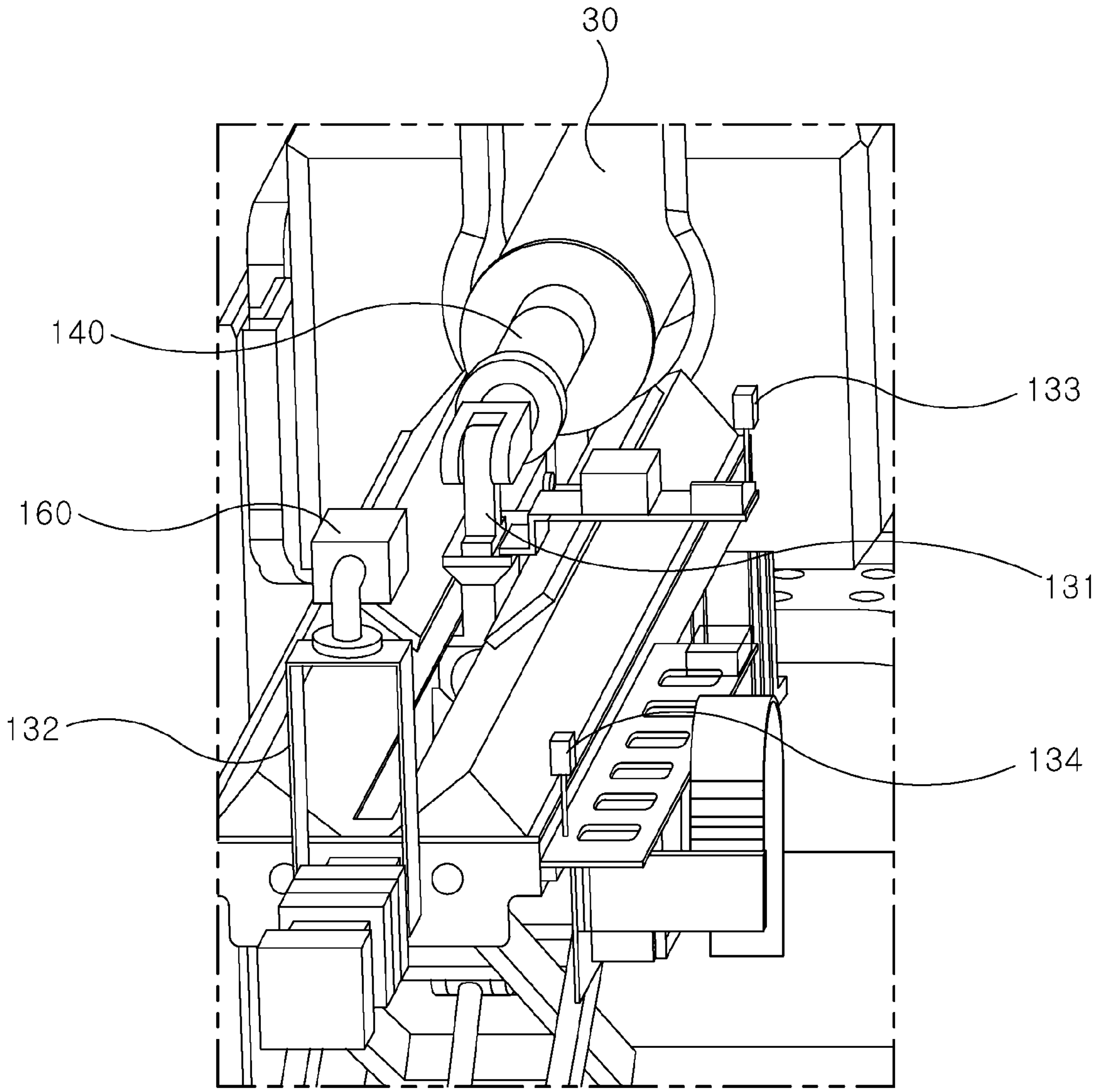

FIGS. 5 and 6 are views illustrating a shell loading operation of the system for autonomously conveying and loading a shell into a fixed gun according to the present invention, and FIGS. 7 and 8 are views illustrating states in which a shell is loaded by the system for autonomously conveying and loading a shell into a fixed gun according to the present invention.

Hereinafter, the unmanned shell loading system according to the present invention will be more specifically described, and then the operation of loading the testing shell 30 will be described.

As illustrated in FIGS. 1 and 4, the unmanned shell loading system 100 moves to the rear side of the fixed gun 10, i.e., the loading position and then is on standby in a stopped state. Thereafter, the unmanned shell loading system 100 operates in the loading mode illustrated in FIG. 3 and loads the testing shell 30 into the gun battery cartridge chamber 11 of the fixed gun 10.

The shell lifting device 120 includes lifting members coupled to intersect one another in an X shape by hinge shafts. A lower end of the lifting member is configured to be slidable in a forward/rearward direction on an upper end of the autonomous conveyance device 110. When the lifting members operate so that intervals therebetween are decreased, a height of the automatic loading device 130 mounted on an upper portion of the lifting member is increased. The lifting members may be operated by a hydraulic actuator or by electric power.

An upper end of the lifting member is mounted to be slidable in the forward/rearward direction on a lower end of the automatic loading device 130. The automatic loading device 130 is moved upward or downward by the shell lifting device 120. As illustrated, the automatic loading device 130 is provided in the form of a tray that stably holds the testing shell 30.

The tray may be divided into two bar structures spaced apart from each other at a predetermined interval, and the testing shell 30 may be stably mounted between the two bar structures. Alternatively, the tray may be configured as a single structure having a concave portion in which the testing shell 30 may be seated.

A cartridge chamber proximity sensor (not illustrated) is provided at a front end of the tray of the automatic loading device 130 and detects a position of the shell lifting device 120 that moves upward. The automatic loading device 130 is moved upward until the testing shell 30 reaches a height at which the testing shell 30 corresponds to the cartridge chamber 11, i.e., the testing shell reaches a reference position required to align the cartridge chamber.

Further, a rammer coupling member 131 is provided on an upper surface of the rear end of the tray of the automatic loading device 130, and a rear end of the shell rammer device 140 to be described below is rotatably coupled to the rammer coupling member 131.

In addition, a camera mounting member 132 is provided at a rear end of the tray of the automatic loading device 130, and a camera 160 is mounted on the camera mounting member 132. The camera 160 captures images related to a loaded state of the testing shell 30 or the like and transmits the images to the remote control system, such that the remote control system may identify the loaded state of the testing shell 30 or the like.

Further, a loading position sensor 133 may be provided at an upper end of a front end of the tray of the automatic loading device 130, and a rammer alignment sensor 134 may be provided at an upper end of the rear end of the tray of the automatic loading device 130.

That is, when the automatic loading device 130 moves upward to a height at which the testing shell 30 corresponds to the cartridge chamber 11, the front end of the tray is positioned at an end of a blocker of an inlet of the cartridge chamber 11. When a blocker detection sensor 150 detects contact with the blocker, the shell rammer device 140 operates forward and pushes the testing shell 30 so that the testing shell 30 may be loaded into the cartridge chamber 11.

The rammer alignment sensor 134 detects a position of the shell rammer device 140 when the shell rammer device 140 is retracted, thereby identifying whether the shell rammer device 140 is aligned with an exact position.

Next, the shell rammer device 140 includes a rammer having a rear end rotatably coupled to the rammer coupling member 131 and inserted into the body, such that the rammer is disposed forward and rearward in a longitudinal direction thereof. A front end of the rammer adjoins the rear end of the testing shell 30.

Further, the rammer may be rectilinearly moved in the forward/rearward direction by a drive motor and a rammer driving means such as a ball-screw mechanism.

Meanwhile, the blocker detection sensor 150 may be mounted at one side of the front end of the automatic loading device 130 and detect the position of the blocker when the shell rammer device 140 is operated forward by the loading position sensor 133. In addition, when the blocker moves upward to close the cartridge chamber 11 within about 250 msec after the shell rammer device 140 pushes and moves the testing shell 30 to the loading position, the shell rammer device 140 rotates upward about the rammer coupling member 131.

Figure 9:
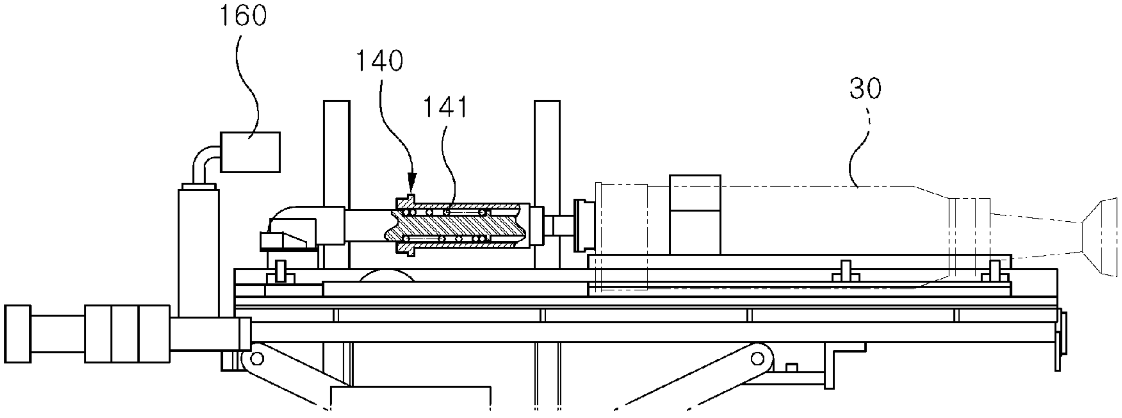
FIG. 9 is a view illustrating a partial lateral cross-sectional shape of the system for autonomously conveying and loading a shell into a fixed gun according to the present invention.

In addition, as illustrated in FIG. 9, the shell rammer device 140 is equipped with an impact mitigation spring 141 that operates when the impact mitigation spring 141 is pressed from the front side by 50 kg or more, which makes it possible to mitigate impact applied to a rear portion (detonator) of the testing shell 30 during the abnormal loading process. That is, the impact mitigation spring 141 may be coupled between the rammer and the inside of the body and elastically support the rammer.

In this case, a loading force may be maximum 35 kg. The extension and retraction of the rammer are adjusted according to a rotational speed of the drive motor, such that the rammer operates with a variable speed profile at a location where a collision between the shell and the cartridge chamber is predicted, thereby mitigating collision impact between the shell and the cartridge chamber during the loading process. The loading process is performed at two stages. The image devices installed rearward of the tray before the loading process may allow the user to identify all the processes of loading the shell.

A primary shell conveyance is on standby after ⅔ or more of the shell is loaded into the cartridge chamber after the loading alignment, and a secondary shell conveyance loads the shell to a blocker operation point.

The operations of the constituent devices are performed by receiving electric power from a rechargeable battery in the apparatus. The communication with the remote controller may be performed, which makes it possible to perform remote control related to the driving, loading, and returning processes of the system. In addition, an environment in which the loading process and the traveling process are monitored by the image devices such as the camera 160 is implemented. Therefore, in the event of an emergency, the user may use a remote controller and perform an emergency safety procedure. For example, the remote controller may perform communication within a distance of 25 m.

While the present invention has been described with reference to the exemplified drawings, it is obvious to those skilled in the art that the present invention is not limited to the aforementioned embodiments, and may be variously changed and modified without departing from the spirit and the scope of the present invention. Accordingly, the changed or modified examples belong to the claims of the present invention and the scope of the present invention should be interpreted on the basis of the appended claims.

DESCRIPTION OF REFERENCE NUMERALS

10: Fixed gun
11: Gun battery
21: Gun mount
22: Inclined structure
30: Testing shell
100: Unmanned shell loading system
110: Autonomous conveyance device
111: Drive means
112: Operation panel
120: Shell lifting device
130: Automatic loading device

131: Rammer coupling member
132: Camera mounting member
133: Loading position sensor
134: Rammer alignment sensor
140: Shell rammer device
141: Impact mitigation spring
150: Blocker detection sensor
160: Camera

The invention claimed is:

1. A system for autonomously conveying and loading a shell into a fixed gun, the system comprising:
- an autonomous conveyance device configured to autonomously travel and move according to an autonomous driving program from a shell storage location to a fixed gun fixed to a gun mount that is a destination;
- an automatic loading device configured to hold a testing shell and automatically load the testing shell into a cartridge chamber of the fixed gun; and
- a shell lifting device mounted on an upper surface of the autonomous conveyance device and a lower surface of the automatic loading device and configured to move the automatic loading device upward or downward,
- wherein the automatic loading device comprises:
  - a tray on which the testing shell is seated; and
  - a rammer coupling member mounted on an upper surface of a rear end of the tray, and
- wherein the automatic loading device further comprises a shell rammer device configured to load the testing shell, which is seated on the tray, into the cartridge chamber,
- wherein the shell rammer device comprises:
  - a body having a rear end coupled to the rammer coupling member;
  - a rammer inserted into the body and having a front end disposed rearward of the testing shell; and
  - a rammer driving means configured to move the rammer forward or rearward wherein a loading position sensor is mounted at an upper end of a front end of the tray and detects a loading position of the testing shell made by a forward movement of the rammer.

2. The system of claim 1, wherein the shell lifting device comprises:
- a plurality of lifting members coupled to intersect one another by a hinge shaft; and
- a hydraulic actuator configured to rotate the lifting members about the hinge shaft.

3. The system of claim 1, wherein a rammer alignment sensor is mounted at an upper end of the rear end of the tray and detects a retracted position of the rammer.

4. The system of claim 1, wherein a blocker detection sensor is mounted at one side of a front end of the automatic loading device and detects a distance between the rammer and a blocker configured to close the cartridge chamber.

5. The system of claim 4, wherein a rear end of the rammer is rotatably coupled to the rammer coupling member, and the rammer is rotated about the rammer coupling member by an operation of the blocker.

6. The system of claim 5, wherein an impact mitigation spring is coupled between the rammer and an inside of the body of the shell rammer device and mitigates impact from a front side of the rammer.

7. The system of claim 1, further comprising:
- a camera mounting member provided at the rear end of the tray; and
- a camera mounted on the camera mounting member.

8. The system of claim 7, wherein the autonomous conveyance device comprises a drive means configured to operate the autonomous conveyance device, and wherein the system comprises:

a controller for autonomous driving and remote control;

a communicator configured to communicate with an external remote control system;

a rechargeable battery configured to supply power to the drive means, the controller, and the communicator; and a proximity sensor embedded to detect a surrounding environment during autonomous driving.

9. A system for autonomously conveying and loading a shell into a fixed gun, the system comprising:

an autonomous conveyance device configured to autonomously travel and move according to an autonomous driving program from a shell storage location to a fixed gun fixed to a gun mount that is a destination;

an automatic loading device configured to hold a testing shell and automatically load the testing shell into a cartridge chamber of the fixed gun; and a shell lifting device mounted on an upper surface of the autonomous conveyance device and a lower surface of the automatic loading device and configured to move the automatic loading device upward or downward, wherein the automatic loading device comprises:

a tray on which the testing shell is seated; and a rammer coupling member mounted on an upper surface of a rear end of the tray, and wherein the automatic loading device further comprises a shell rammer device configured to load the testing shell, which is seated on the tray, into the cartridge chamber, wherein a cartridge chamber proximity sensor is mounted on the tray and detects whether the tray moves upward and reaches a reference position aligned with a height of the cartridge chamber.

10. An automatic loading device, which holds a testing shell and automatically loads the testing shell into a cartridge chamber of a fixed gun, the automatic loading device comprising:

a tray on which the testing shell is seated;

a rammer coupling member mounted on an upper surface of a rear end of the tray;

a rammer body having a rear end coupled to the rammer coupling member;

a rammer inserted into the rammer body and configured to load the testing shell, which is seated on the tray, into the cartridge chamber, a ball screw coupled to the rammer; and a drive motor configured to rotate the ball screw, wherein a loading position sensor is mounted at an upper end of a front end of the tray and detects a loading position of the testing shell made by a forward movement of the rammer, and wherein a rammer alignment sensor is mounted at an upper end of a rear end of the tray and detects a retracted position of the rammer.

11. The automatic loading device of claim 10, wherein a blocker detection sensor is mounted at one side of a front end of the automatic loading device and detects a distance between the rammer and a blocker configured to close the cartridge chamber, wherein a rear end of the rammer is rotatably coupled to the rammer coupling member, and wherein the rammer is rotated about the rammer coupling member by an operation of the blocker.

12. The automatic loading device of claim 10, wherein an impact mitigation spring is coupled between the rammer and an inside of the rammer body and mitigates impact from a front side of the rammer.

13. The automatic loading device of claim 10, further comprising:

a camera mounting member provided at the rear end of the tray; and a camera mounted on the camera mounting member.

* * * * *